US009992324B2

(12) United States Patent
Tanabe et al.

(10) Patent No.: US 9,992,324 B2
(45) Date of Patent: Jun. 5, 2018

(54) MOBILE ELECTRONIC DEVICE, CONTROL METHOD, AND NON-TRANSITORY STORAGE MEDIUM

(71) Applicant: KYOCERA Corporation, Kyoto-shi, Kyoto (JP)

(72) Inventors: Shigeki Tanabe, Yokohama (JP); Hideki Morita, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days. days.

(21) Appl. No.: 15/129,411

(22) PCT Filed: Mar. 25, 2015

(86) PCT No.: PCT/JP2015/059212
§ 371 (c)(1),
(2) Date: Sep. 26, 2016

(87) PCT Pub. No.: WO2015/147087
PCT Pub. Date: Oct. 1, 2015

(65) Prior Publication Data
US 2017/0104864 A1    Apr. 13, 2017

(30) Foreign Application Priority Data

Mar. 27, 2014  (JP) ................. 2014-067190

(51) Int. Cl.
*H04M 1/72* (2006.01)
*H04M 1/725* (2006.01)

(52) U.S. Cl.
CPC ... *H04M 1/72569* (2013.01); *H04M 1/72563* (2013.01); *H04M 1/72577* (2013.01); *H04M 2250/12* (2013.01)

(58) Field of Classification Search
CPC ........ H04W 4/027; H04W 4/04; H04W 4/043
(Continued)

(56) References Cited

U.S. PATENT DOCUMENTS

2002/0017989 A1* 2/2002 Forster .................. G01S 5/0018
340/540
2005/0267650 A1* 12/2005 Carpenter ................. G06F 1/26
701/3
(Continued)

FOREIGN PATENT DOCUMENTS

| JP | 2009-267770 A | 11/2009 |
|----|---------------|---------|
| JP | 2011-217120 A | 10/2011 |
| JP | 2011217120 A * | 10/2011 |

OTHER PUBLICATIONS

International Search Report in PCT/JP2015/059212, dated May 19, 2015.

*Primary Examiner* — Dung Hong
(74) *Attorney, Agent, or Firm* — Hauptman Ham, LLP

(57) ABSTRACT

A mobile electronic device (e.g., a mobile phone) includes a sensor and at least one controller. The controller performs a control base on a detection result that is detected by the sensor. For example, the controller is configured to determine a moving state by aircraft base on the detection result that is detected by the sensor. When the sensor is an atmospheric pressure sensor that is configured to detect atmospheric pressure, the controller is configured to determine the moving state by aircraft by a decrease in the atmospheric pressure, and after a determination of the moving state by aircraft, the at least one controller is further configured to keep the determination of the moving state by aircraft until the atmospheric pressure increases.

6 Claims, 8 Drawing Sheets

(58) Field of Classification Search
USPC .......................................................... 455/418
See application file for complete search history.

(56) References Cited

U.S. PATENT DOCUMENTS

| | | | | |
|---|---|---|---|---|
| 2009/0117919 | A1* | 5/2009 | Hershenson | H04W 48/04 |
| | | | | 455/456.4 |
| 2009/0280858 | A1* | 11/2009 | Ahn | H04M 1/72577 |
| | | | | 455/550.1 |
| 2010/0248662 | A1* | 9/2010 | Sheynblat | H04W 52/0274 |
| | | | | 455/127.1 |
| 2011/0044177 | A1* | 2/2011 | Nair | H04L 41/12 |
| | | | | 370/241 |
| 2011/0282620 | A1* | 11/2011 | Sakuraoka | G01C 21/12 |
| | | | | 702/141 |
| 2012/0071151 | A1* | 3/2012 | Abramson | H04L 67/12 |
| | | | | 455/418 |
| 2013/0099963 | A1* | 4/2013 | Wu | G01S 19/46 |
| | | | | 342/357.29 |
| 2013/0325887 | A1* | 12/2013 | Takaoka | G06F 17/30283 |
| | | | | 707/758 |
| 2015/0330780 | A1* | 11/2015 | Yuzawa | G01C 5/06 |
| | | | | 702/150 |
| 2015/0382232 | A1* | 12/2015 | Maekawa | H04W 24/06 |
| | | | | 370/230 |

* cited by examiner

FIG.2

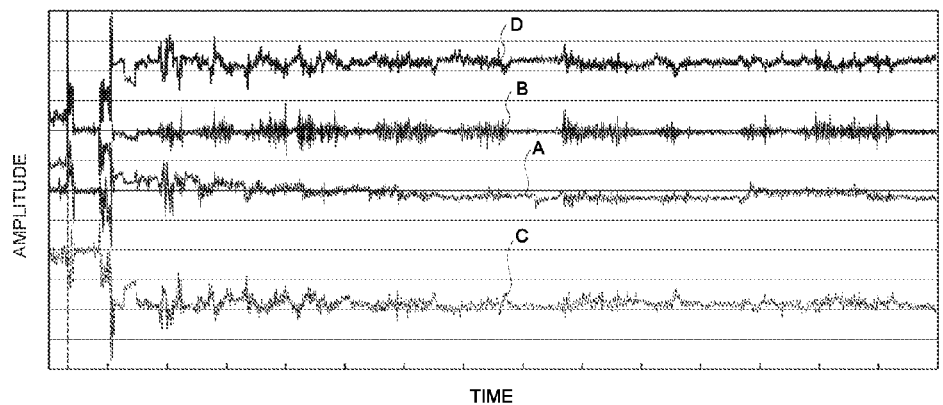

FIG.3

| ACCELERATION PATTERN | STATE | TYPE OF VEHICLE | DETERMINATION CONDITION |
|---|---|---|---|
| PATTERN P1 | STATIONARY STATE | - | - |
| PATTERN P2 | WALKING STATE | - | - |
| PATTERN P3 | RUNNING STATE | - | - |
| PATTERN P4 | MOVING STATE BY VEHICLE | CAR | - |
| PATTERN P5 | MOVING STATE BY VEHICLE | BIKE | - |
| PATTERN P6 | MOVING STATE BY VEHICLE | TRAIN | - |
| PATTERN P7 | MOVING STATE BY VEHICLE | BUS | - |
| PATTERN P8 | MOVING STATE BY VEHICLE | AIRCRAFT | DETERMINATION CONDITION FOR ATMOSPHERIC PRESSURE |
| PATTERN P9 | MOVING STATE BY BICYCLE | - | - |

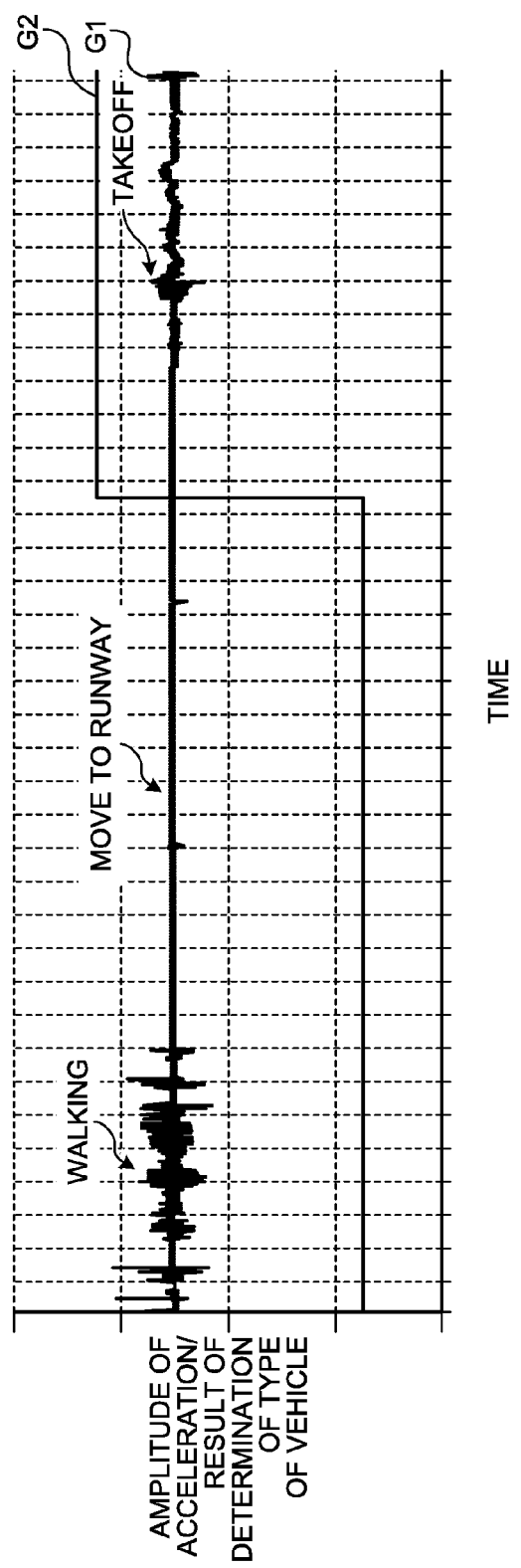

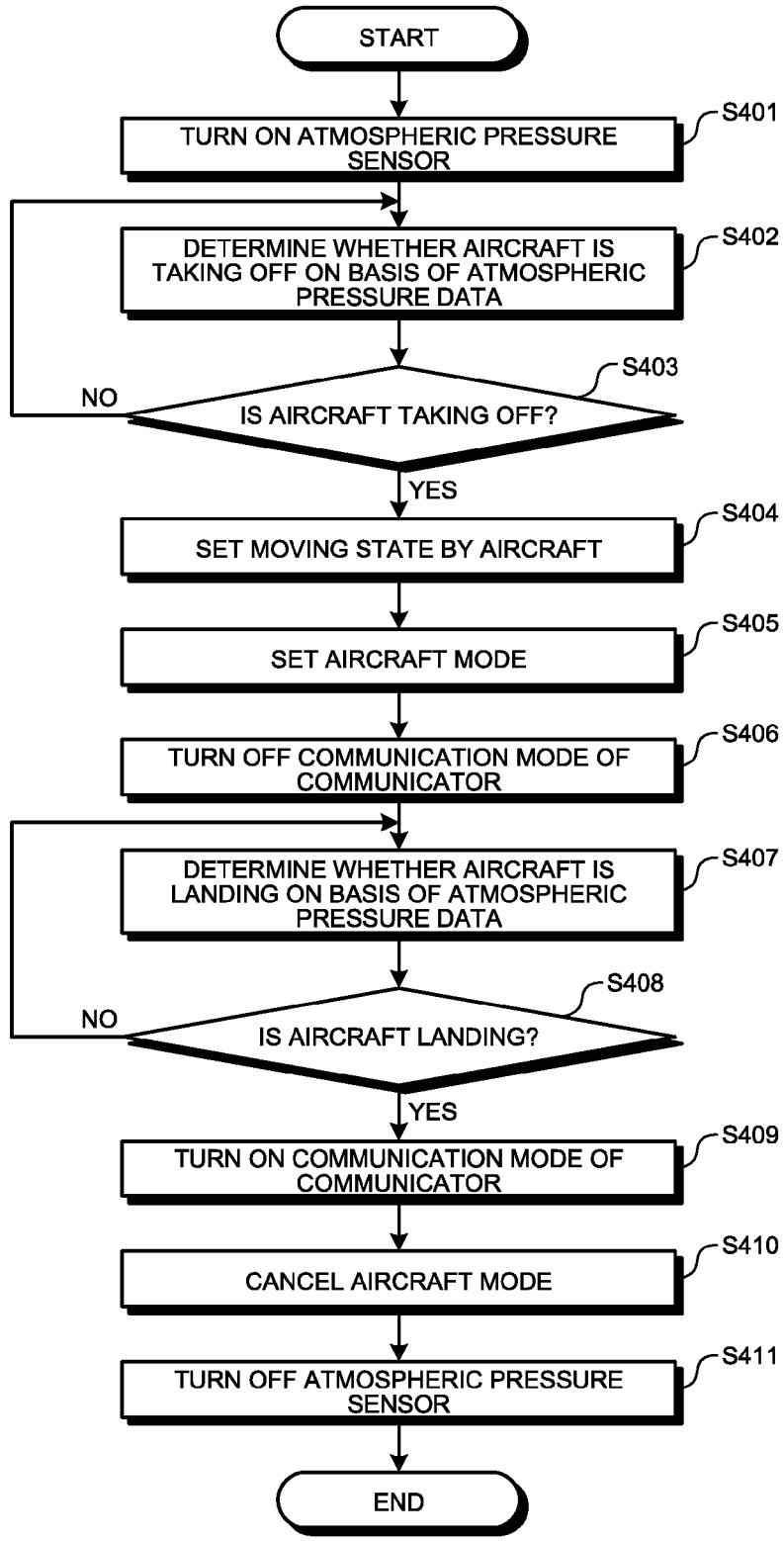

MOBILE ELECTRONIC DEVICE, CONTROL METHOD, AND NON-TRANSITORY STORAGE MEDIUM

CROSS-REFERENCE TO RELATED APPLICATION

The present application is a National Phase entry of International Application No. PCT/JP2015/059212, filed Mar. 25, 2015, which claims priority of Japanese Application No. 2014-067190, filed Mar. 27, 2014.

FIELD

The present invention relates to a mobile electronic device, a control method, and a non-transitory storage medium.

BACKGROUND

There are mobile electronic devices that are capable of determining whether they are on the move. For example, JP-A-2009-267770 discloses a technology for determining movement by a vehicle, such as a train, by using detection results of an acceleration sensor, or the like.

SUMMARY

A mobile electronic device, a control method, and a non-transitory storage medium are disclosed.

In one aspect, there is provided a mobile electronic device comprising: a sensor; and at least one controller configured to perform a control based on a detection result that is detected by the sensor, wherein the at least one controller is configured to determine a moving state by aircraft based on the detection result that is detected by the sensor.

In one aspect, there is provided a control method for a mobile electronic device that includes a sensor, comprising: performing a control based on a detection result that is detected by the sensor; and determining a moving state by aircraft based on the detection result that is detected by the sensor.

In one aspect, there is provided a non-transitory storage medium for causing a mobile electronic device, including a sensor, to execute: performing a control based on a detection result that is detected by the sensor; and determining a moving state by aircraft based on the detection result that is detected by the sensor.

BRIEF DESCRIPTION OF THE DRAWINGS

FIG. 2 is a diagram that schematically illustrates detection results of an acceleration sensor.

FIG. 3 is a diagram that illustrates an example of structure of determination data.

FIG. 4 is a diagram that schematically illustrates the moving state by aircraft.

FIG. 9 is a flowchart that illustrates a process in a modification of determination for aircraft by the mobile phone.

DETAILED DESCRIPTION OF THE PREFERRED EMBODIMENTS

With reference to the drawings, a detailed explanation is given of embodiments for implementing a mobile electronic device, a control method, and a control program according to the present application. An explanation is given below of a mobile phone as an example of the mobile electronic device.

Figure 1:
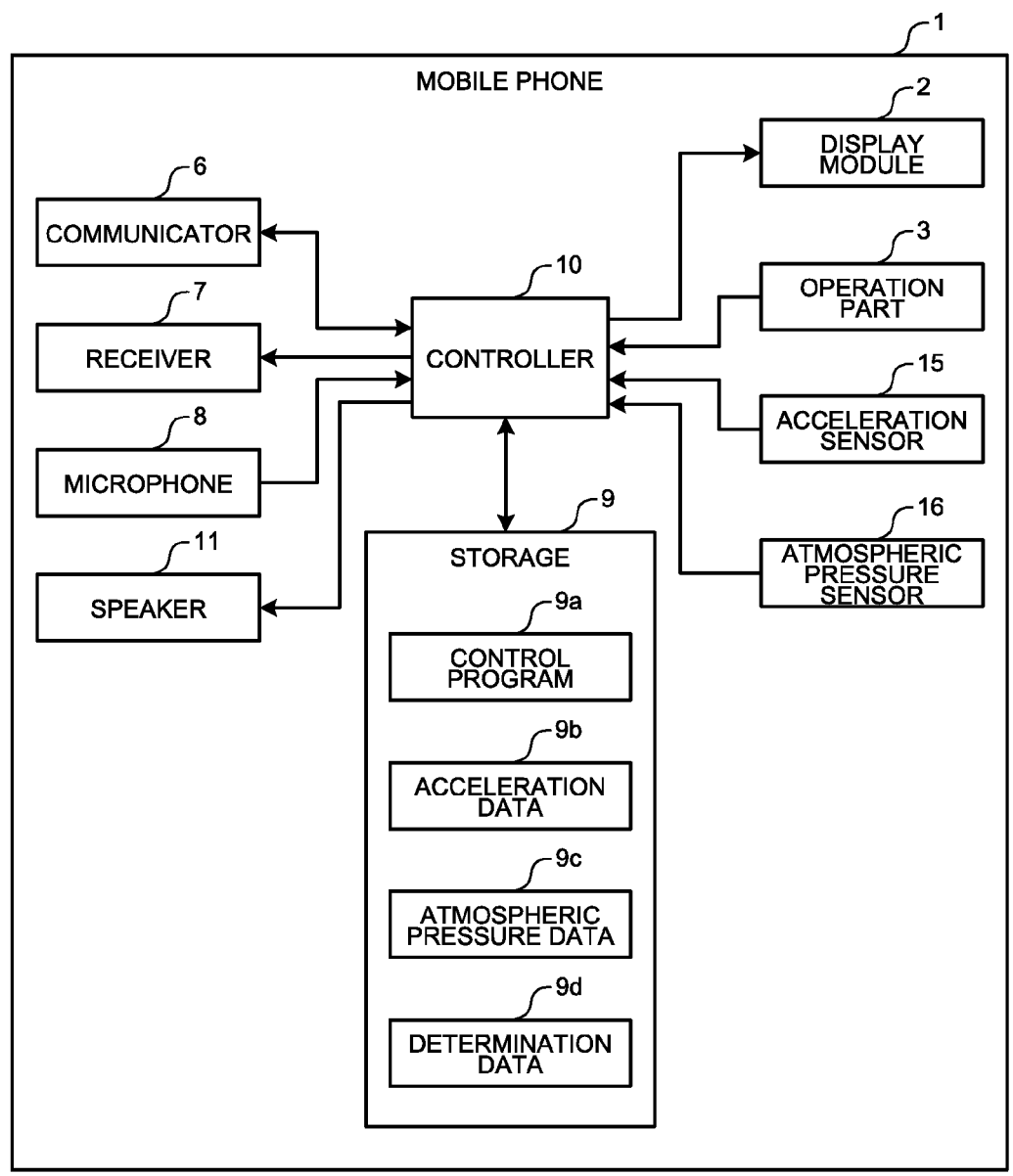
FIG. 1 is a block diagram of a mobile phone.

FIG. 1 is a block diagram of a mobile phone 1. As illustrated in FIG. 1, the mobile phone 1 includes a display module 2, an operation part 3, a communicator 6, a receiver 7, a microphone 8, a storage 9, a controller 10, a speaker 11, an acceleration sensor 15, and an atmospheric pressure sensor 16.

The display module 2 includes a display panel. The display panel includes a liquid crystal display (Liquid Crystal Display), an organic EL display (Organic Electro-Luminescence Display), or the like. The display module 2 is capable of displaying information in response to signals that are input from the controller 10. Displayed information includes characters, graphics, images, or the like. Displayed information includes screens for giving information, icons, or the like.

The operation part 3 includes multiple devices. The devices may receive user's operations. Examples of the devices include, but are not limited to, a key, button, touch screen, etc. The operation part 3 is capable of inputting signals, corresponding to received operations, to the controller 10.

The communicator 6 is capable of performing wireless communication. The communicator 6 may support at least one of the wireless communication standards. Examples of the wireless communication standards include, but are not limited to, communication standards for cellular phones, such as 2G, 3G, or 4G. Examples of the communication standards for cellular phones include, but are not limited to, LTE (Long Term Evolution), W-CDMA (Wideband Code Division Multiple Access), CDMA2000 (Code Division Multiple Access 2000), PDC (Personal Digital Cellular), GSM (registered trademark) (Global System for Mobile Communications), PHS (Personal Handy-phone System), etc. Examples of the wireless communication standards furthermore include, but are not limited to, WiMAX (Worldwide Interoperability for Microwave Access), IEEE802.11, Bluetooth (registered trademark), IrDA (Infrared Data Association), NFC (Near Field Communication), etc.

The communicator 6 may receive radio signals at a predetermined frequency band from the GPS satellites. The communicator 6 may demodulate received radio signals. The communicator 6 may send demodulated signals to the controller 10. The mobile phone 1 may include an individual communicator that is separated from the communicator 6, where the function to communicate with the GPS satellites is separated from the communicator 6.

The receiver 7 and the speaker 11 are examples of an output module that outputs sounds. The receiver 7 and the speaker 11 are capable of outputting sound signals, input from the controller 10, as sound. The receiver 7 may be used to, for example, output voice of a partner on calling. The speaker 11 may be used to, for example, output ring tones and music. One of the receiver 7 and the speaker 11 may perform the function of the other. The microphone 8 is one example of an input module that inputs sounds. The microphone 8 is capable of converting user's voice, or the like, into sound signals and inputting them to the controller 10.

The storage 9 is capable of storing programs and data. The storage 9 may be used as a work area to temporarily store processing results of the controller 10. The storage 9 includes a recording medium. The recording medium may include any non-transitory storage media, such as semiconductor storage media or magnetic storage media. The storage 9 may include multiple types of storage media. The storage 9 may include a combination of a portable storage medium, such as a memory card, optical disk, or magnetic optical disk, and a reading device for storage media. The storage 9 may include a storage device that is used as a temporary memory area, such as a RAM (Random Access Memory).

The storage 9 stores, for example, a control program 9a, acceleration data 9b, atmospheric pressure data 9c, and determination data 9d. The control program 9a is capable of providing functions related to various types of controls for operating the mobile phone 1. The acceleration data 9b includes information that indicates the acceleration acting on the mobile phone 1. The atmospheric pressure data 9c includes information that indicates the atmospheric pressure acting on the mobile phone 1. The determination data 9d includes information that is used to determine the state of the mobile phone 1.

The acceleration data 9b may include multiple pieces of acceleration information. The acceleration data 9b is stored as time series data. The acceleration information includes items, such as time and acceleration. The time indicates a time when the acceleration sensor 15 detects the acceleration. The acceleration indicates a value of the acceleration that is detected by the acceleration sensor 15.

The atmospheric pressure data 9c may include multiple pieces of atmospheric pressure information. The atmospheric pressure data 9c is stored as time series data. The atmospheric pressure information includes items, such as time and atmospheric pressure. The time indicates a time when the atmospheric pressure sensor 16 detects the atmospheric pressure. The atmospheric pressure indicates a value of the atmospheric pressure, detected by the atmospheric pressure sensor 16.

The control program 9a is capable of providing functions related to various types of controls for operating the mobile phone 1. The control program 9a may control, for example, the communicator 6, the receiver 7, or the microphone 8 so as to make a telephone call. The functions, provided by the control program 9a, include controls on the acceleration sensor 15, the atmospheric pressure sensor 16, or the like. The control program 9a includes a function to determine state of the mobile phone 1 based on the acceleration and the atmospheric pressure and a function to determine a movement by a vehicle based on the state of the mobile phone 1. The functions provided by the control program 9a may be used in combination with functions provided by a different program.

The controller 10 includes an arithmetic processing device. Examples of the arithmetic processing device include, but are not limited to, a CPU (Central Processing Unit), SoC (System-on-a-Chip), MCU (Micro Control Unit), FPGA (Field-Programmable Gate Array), etc. The controller 10 is capable of integrally controlling operations of the mobile phone 1. Various functions are implemented under the control of the controller 10.

Specifically, the controller 10 is capable of executing commands that are included in the programs, stored in the storage 9. The controller 10 may refer to data, stored in the storage 9, if needed. The controller 10 controls functional modules in accordance with data and commands. The controller 10 controls functional modules, thereby implementing various functions. Examples of the functional module include, but are not limited to, the display module 2, the communicator 6, the receiver 7, the speaker 11, etc. The controller 10 sometimes changes controls in accordance with detection results of detectors. Examples of the detector include, but are not limited to, the operation part 3, the communicator 6, the microphone 8, the acceleration sensor 15, the atmospheric pressure sensor 16, etc.

The acceleration sensor 15 is capable of detecting a direction and amplitude of the acceleration acting on the mobile phone 1. The acceleration sensor 15 may output detected results to the controller 10. For example, the acceleration sensor 15 may detect the acceleration in the direction of the X axis, the acceleration in the direction of the Y axis, and the acceleration in the direction of the Z axis. The acceleration sensor 15 may transmit, to the controller 10, the three detected accelerations and a vector value, which is obtained by composing the three detected accelerations, as a detection result of the acceleration sensor 15. The atmospheric pressure sensor 16 is capable of detecting the atmospheric pressure acting on the mobile phone 1. The atmospheric pressure sensor 16 may output the detected result to the controller 10.

An explanation is given of a function to determine state of the mobile phone 1 and a function to determine type of a vehicle.

The mobile phone 1 has a function to determine multiple states of the own device. The states of the mobile phone 1 include the states of the user who uses the mobile phone 1. Examples of the states of the mobile phone 1 include, but are not limited to, the stationary state, the walking state, the running state, the moving state by vehicle, the moving state by bicycle, etc. The stationary state includes a state where the user, who carries the mobile phone, remains stationary, or a state where the mobile phone 1 rests. The walking state includes a state where the user, who carries the subject device, is walking. The running state includes a state where the user, who carries the subject device, is running. The moving state by vehicle includes a state where the user, who carries the subject device, is moving by vehicle. Examples of the vehicle include, but are not limited to, vehicles that use a motor, such as a car, bike, train, bus, or aircraft, other than bicycle. The moving state by bicycle includes a state where the user, who carries the subject device, is moving by bicycle.

FIG. 2 is a diagram that schematically illustrates detection results of the acceleration sensor 15. As illustrated in FIG. 2, the detection results of the acceleration sensor 15 may include the acceleration in the direction of the X axis (A in FIG. 2), the acceleration in the direction of the Y axis (B in FIG. 2), the acceleration in the direction of the Z axis (C in FIG. 2), and the vector value (D in FIG. 2) composed of the three accelerations. The controller 10 receives detection results of the acceleration sensor 15. The controller 10 may log the detection results in the acceleration data 9b of the storage 9.

The controller 10 is capable of executing the control program 9a. The controller 10 analyzes the acceleration data 9b to determine the state of the mobile phone 1. For example, to determine the state of the mobile phone 1, the controller 10 may use data of acceleration patterns. The determination data 9d includes the acceleration patterns. For example, the storage 9 may previously store the acceleration pattern as the determination data 9d.

The determination data 9d includes multiple acceleration patterns that correspond to the states of the mobile phone 1. Each of the acceleration patterns is a characteristic pattern that is extracted for each of the states of the mobile phone 1. Each acceleration pattern may be extracted by previously measuring the pattern that is detected by the acceleration sensor 15 in each of the state of the mobile phone. The acceleration pattern may be stored such that it corresponds to the data of the composite vector value logged.

FIG. 3 is a diagram that illustrates an example of structure of the determination data 9d. In the example illustrated in FIG. 3, the determination data 9d includes determination information that corresponds to the states of the mobile phone 1. The determination information includes items, such as the acceleration pattern, the state of the mobile phone, the type of vehicle, or determination condition. The determination information on a pattern P1 includes the acceleration pattern that corresponds to the stationary state. The determination information on a pattern P2 includes the acceleration pattern that corresponds to the walking state. The determination information on a pattern P3 includes the acceleration pattern that corresponds to the running state. Each of the determination information on a pattern P4 to a pattern P8 corresponds to the type of vehicle, such as a car, bike, train, bus, or aircraft, and it includes the acceleration pattern that corresponds to the moving state by the vehicle. The determination information on a pattern P9 includes the acceleration pattern that corresponds to the moving state by bicycle.

In the determination information on the pattern P8, corresponding to the aircraft, the determination condition for improving determination accuracy of the moving state by aircraft is set in the item of the determination condition. The determination condition includes determination condition of the atmospheric pressure to determine takeoff and landing of the aircraft. Examples of the determination condition of the atmospheric pressure with regard to takeoff and landing may include, but are not limited to, thresholds for amount of change in the atmospheric pressure during takeoff and during landing, atmospheric pressure patterns, etc. If only takeoff of the aircraft is determined, the mobile phone 1 may previously set at least the determination condition corresponding to takeoff in the determination data 9d.

The controller 10 may compare the pattern of the composite vector with the acceleration pattern in the determination data 9d. The controller 10 may determine that the state that corresponds to the acceleration pattern, which is matched during comparison, is the state of the mobile phone 1. For this comparison, a case of matching perfectly and a case of matching at a predetermined percentage are regarded to be matched. In other words, for this comparison, the matching is not limited to be matched perfectly.

For example, if the pattern of the composite vector matches the pattern P1, P2, P3, or P9 in the determination data 9d, the controller 10 may determine that the mobile phone 1 is in the stationary state, the walking state, the running state, or the moving state by bicycle, respectively. For example, if the pattern of the composite vector matches any one of the pattern P4 to the pattern P8 in the determination data 9d, the controller 10 may determine that the state of the mobile phone 1 is the moving state by vehicle. In this case, the controller 10 may determine that the type of vehicle, corresponding to the matched acceleration pattern, is the type of vehicle which the user of the mobile phone 1 is on board.

If the controller 10 determines that the mobile phone 1 is in the moving state by vehicle, it may perform an operation that corresponds to the determined vehicle. For example, riding on a car for a long time is sometimes risky due to the user's tiredness or decrease in concentration. If the controller 10 determines that it is the moving state by car, it may perform an operation to prompt the user to take a break at a predetermined timing. For example, major train stations sometimes have an environment that allows use of wireless communications. If the controller 10 determines that it is the moving state by train, it performs a control so as to automatically turn on the wireless communication function of the communicator 6. For example, in some cases, there is a restriction on the use of electronic devices by users in the aircraft. If the controller 10 determines that it is the moving state by aircraft, it may perform an operation to restrict the use of the mobile phone 1.

Instead of determining by the acceleration pattern of the stationary state, the controller 10 may determine the stationary state if the data of the composite vector logged does not match any of the moving states.

With reference to FIG. 4, an explanation is given of an example of the control with regard to determination of type of vehicle by the mobile phone 1 if the vehicle is an aircraft.

FIG. 4 is a diagram that schematically illustrates the moving state by aircraft. As illustrated in a graph G1 of FIG. 4, the amplitude of the acceleration, detected by the acceleration sensor 15 while the user is walking before boarding the aircraft, is higher than that while the aircraft moves toward the runway. If the acceleration pattern in the acceleration data 9b matches the acceleration pattern that corresponds to the walking state in the determination data 9d, the mobile phone 1 determines that the mobile phone 1 is in the walking state.

If the user has boarded the aircraft, the move by aircraft involves the move to the runway before takeoff. While the aircraft is moving toward the runway, the amplitude of the acceleration, detected by the acceleration sensor 15, is low as the amplitude in the moving state by train, for example. If the acceleration pattern in the acceleration data 9b matches the acceleration pattern in the pattern P6, the mobile phone 1 sometimes determines that it is the moving state by vehicle (train) before the aircraft takes off. The mobile phone 1 continues the operation to determine the vehicle.

The aircraft, which has moved to the runway, takes off after the mobile phone 1 determines the vehicle. The amplitude of the acceleration during takeoff of the aircraft changes largely, compared to that while the aircraft is moving to the runway, as illustrated in the graph G1. While the aircraft is in flight, the amplitude of the acceleration becomes low again. If the acceleration pattern, detected during takeoff of the aircraft, matches the acceleration pattern that corresponds to the aircraft in the determination data 9d, the mobile phone 1 determines that it is the moving state by aircraft. If it is determined to be the moving state by aircraft, the mobile phone 1 changes the determined moving state by train to the moving state by aircraft.

The mobile phone 1 may determine the moving state by aircraft based on the acceleration pattern that is detected by the acceleration sensor 15. The mobile phone 1 is capable of determining whether the user is moving by aircraft. If the user starts to move by aircraft, the control of mobile phone 1 may automatically be switched to a control that corresponds to the moving state by aircraft.

For example, if the moving state by aircraft is determined, the mobile phone 1 performs a control so as to turn off communication mode of the communicator 6. Turning off the communication mode may include stopping transmission and reception of radio signals by the communicator 6, stopping electric power supply to the communicator 6, or the like. There is a case where, if the mobile phone 1 determines the moving state by aircraft, a connection to a predetermined network is disconnected so as to reduce the electric power consumption by the communicator 6. For example, if the moving state by aircraft is determined while the aircraft mode is not set, the mobile phone 1 sets the aircraft mode. The aircraft mode may include a control to turn off all the communication settings for the 3G network, WiFi (registered trademark), or the like. Even if the user, who is boarding the aircraft, forgets to switch the mobile phone to the aircraft mode, the mobile phone 1 may be automatically switched to the aircraft mode.

Figure 5:
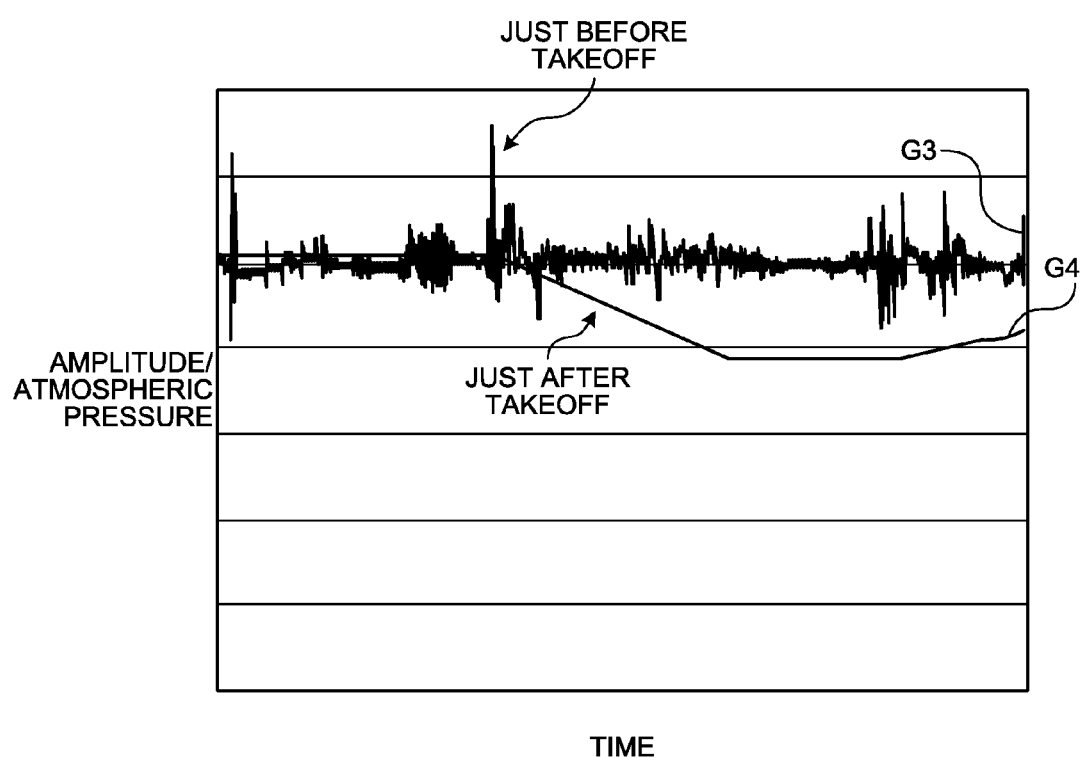
FIG. 5 is a diagram that illustrates a relationship between amplitude and atmospheric pressure in the moving state by aircraft.

With reference to FIG. 5, an explanation is given of an example of the control of the mobile phone 1 where it is determined whether the type of vehicle is an aircraft after a move by vehicle has been determined.

FIG. 5 is a diagram that illustrates a relationship between the amplitude and the atmospheric pressure in the moving state by aircraft. During a running start just before takeoff of the aircraft, a large force of gravity instantaneously acts on the aircraft. As illustrated in a graph G3 of FIG. 5, the amplitude of the acceleration just before the takeoff, detected by the acceleration sensor 15, instantaneously increases. The atmospheric pressure is largely changed in the aircraft just after it takes off until its altitude becomes stable, compared to change of the atmospheric pressure when the user moves by using an elevator, or the like. In the example illustrated in a graph G4 of FIG. 5, as the altitude of the aircraft increases, the atmospheric pressure decreases.

The mobile phone 1 may previously store the atmospheric pressure pattern of atmospheric pressure change, in which the atmospheric pressure decreases during takeoff, as a determination condition in the determination data 9d. If the mobile phone 1 detects decrease in the atmospheric pressure, corresponding to the atmospheric pressure pattern during takeoff, and detects the acceleration pattern that corresponds to the moving state by aircraft, it may determine that it is the moving state by aircraft. If the mobile phone 1 detects at least one of the decrease in the atmospheric pressure and the acceleration pattern, corresponding to takeoff, it may determine that it is the moving state by aircraft.

The mobile phone 1 may determine the moving state by aircraft based on the acceleration pattern, detected by the acceleration sensor 15, and the atmospheric pressure state, detected by the atmospheric pressure sensor 16. In this case, the mobile phone 1 is capable of switching the control, corresponding to the moving state by aircraft.

The atmospheric pressure characteristically changes during landing of the aircraft as well as during takeoff of the aircraft. When the altitude of the aircraft rapidly decreases just before landing, the mobile phone 1 detects rapid increase in the atmospheric pressure by the atmospheric pressure sensor 16. The mobile phone 1 may previously store a characteristic acceleration pattern during landing and a characteristic atmospheric pressure change during landing as determination conditions during landing in the determination data 9d. When the mobile phone 1 detects increase in the atmospheric pressure, corresponding to atmospheric pressure change during landing, it may determine that the aircraft has landed. If it is determined that the aircraft has landed, the mobile phone 1 may terminate the control that corresponds to the moving state by aircraft. For example, if the communication mode of the communicator 6 is off during a flight, the mobile phone 1 turns on the communication mode of the communicator 6 when it is determined that the aircraft has landed. In this case, the user does not need to perform an operation to change the communication mode of the mobile phone 1 when moving by aircraft.

The mobile phone 1 may keep the moving state by aircraft until it is determined that the aircraft has landed. The mobile phone 1 may cancel the moving state by aircraft after it is determined that the aircraft has landed. Alternatively, the mobile phone 1 does not need to determine the moving state by walking, running, or the like, until it is determined that the aircraft has landed. The mobile phone 1 may reduce the possibility of cancelling the moving state by aircraft mistakenly due to the user's walking, running, or the like, in the moving state by aircraft.

Figure 6:
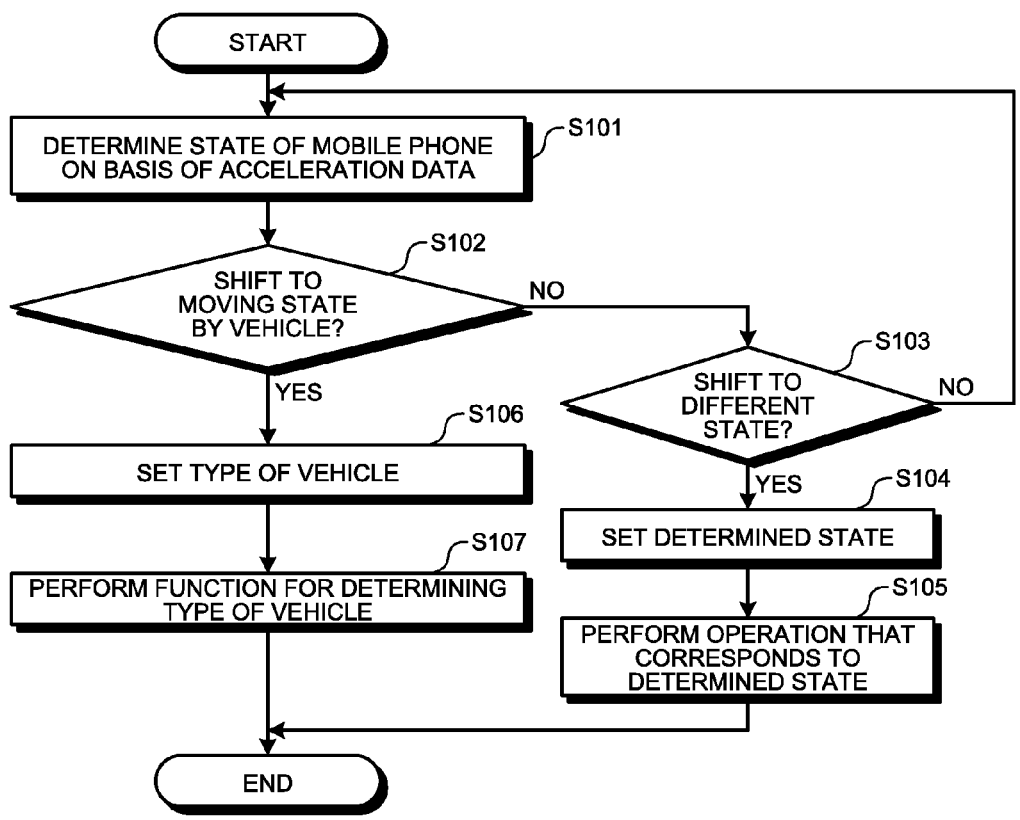
FIG. 6 is a flowchart that illustrates a process in an example of determination of state by the mobile phone.

With reference to FIG. 6, an explanation is given of a process related to the state determination by the mobile phone 1. FIG. 6 is a flowchart that illustrates a process in an example of determination of state by the mobile phone 1. The process, illustrated in FIG. 6, is implemented when the controller 10 executes the control program 9a. The process, illustrated in FIG. 6, is performed when the state of the mobile phone 1 is determined.

As illustrated in FIG. 6, the controller 10 of the mobile phone 1 determines the state of the mobile phone 1 based on the acceleration data 9b as Step S101. Specifically, the controller 10 compares acceleration patterns in the acceleration data 9b with the acceleration patterns in the determination data 9d and determines that the state of the matched acceleration pattern is the state of the mobile phone 1.

If the determined state does not shift to the moving state by vehicle (No at Step S102), the controller 10 proceeds to Step S103. At Step S103, the controller 10 determines whether it shifts to a different state other than the moving state by vehicle. If it does not shift to a different state (No at Step S103), the controller 10 returns to Step S101. If it shifts to a different state (Yes at Step S103), the controller 10 proceeds to Step S104.

At Step S104, the controller 10 sets the state, which is determined at Step S101, as the state of the mobile phone. At Step S105, the controller 10 performs an operation that corresponds to the state, determined at Step S101. Then, the controller 10 terminates the process that is illustrated in FIG. 6.

If it shifts to the moving state by vehicle (Yes at Step S102), the controller 10 proceeds to Step S106. At Step S106, the controller 10 sets the type of vehicle. At Step S107, the controller 10 performs a function for determining type of vehicle and terminates the process that is illustrated in FIG. 6.

Figure 7:
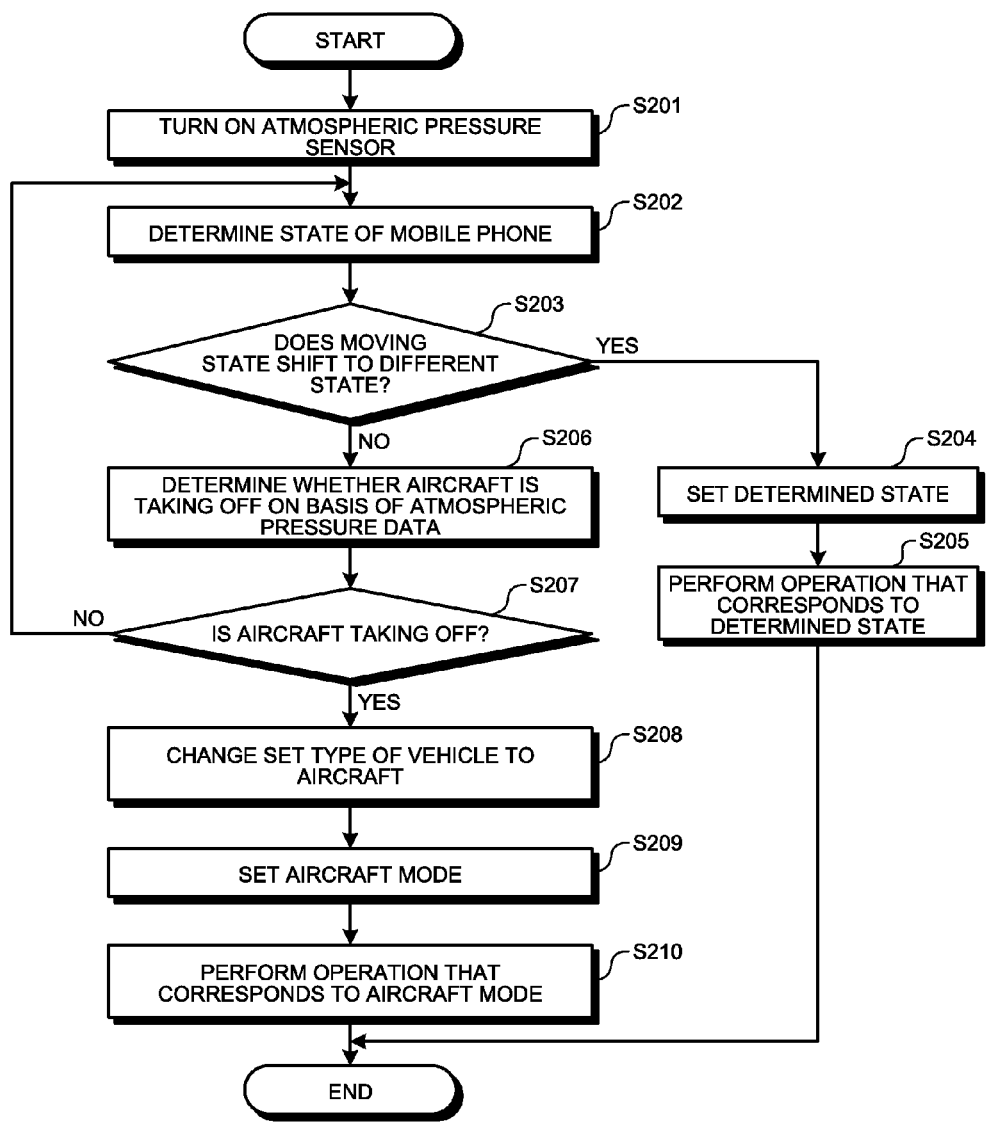
FIG. 7 is a flowchart that illustrates a process in an example of a function for determining type of vehicle by the mobile phone.

With reference to FIG. 7, an explanation is given of a process related to a function for determining type of vehicle by the mobile phone 1. FIG. 7 is a flowchart that illustrates a process in an example of a function for determining type of vehicle by the mobile phone 1. The process, illustrated in FIG. 7, is performed when the controller 10 executes the control program 9a.

As illustrated in FIG. 7, when the function for determining type of vehicle is performed, the controller 10 of the mobile phone 1 turns on the atmospheric pressure sensor 16 at Step S201. At Step S202, the controller 10 determines the state of the mobile phone 1 based on the acceleration data 9b. If the moving state by vehicle shifts to a different state (Yes at Step S203), the controller 10 proceeds to Step S204.

At Step S204, the controller 10 sets the state, which is determined at Step S202, as the state of the mobile phone. At Step S205, the controller 10 performs an operation that corresponds to the state, determined at Step S202. Then, the controller 10 terminates the process that is illustrated in FIG. 7.

If the moving state by vehicle does not shift to a different state (No at Step S203), the controller 10 proceeds to Step S206. At Step S206, the controller 10 determines whether the aircraft is taking off based on the atmospheric pressure data 9c, detected by the atmospheric pressure sensor 16. Specifically, the controller 10 compares the atmospheric pressure state in the atmospheric pressure data 9c with the determination condition during takeoff in the determination data 9d and, if the atmospheric pressure state satisfies the determination condition, determines that the aircraft is taking off. If the aircraft is not taking off (No at Step S207), the controller 10 returns to Step S202. If the aircraft is taking off (Yes at Step S207), the controller 10 proceeds to Step S208.

At Step S208, the controller 10 changes the type of vehicle, which is set during moving to the runway, or the like, to the aircraft. At Step S209, the controller 10 sets the aircraft mode. The aircraft mode is a mode during which the communication mode of the communicator 6 is off. The aircraft mode may be a typical aircraft mode. At Step S210, the controller 10 performs an operation that corresponds to the aircraft mode. Then, the controller 10 terminates the process that is illustrated in FIG. 7.

For example, if the aircraft mode is set by the user, the controller 10 does not need to perform the above-described operations at Step S209 and Step S210.

Figure 8:
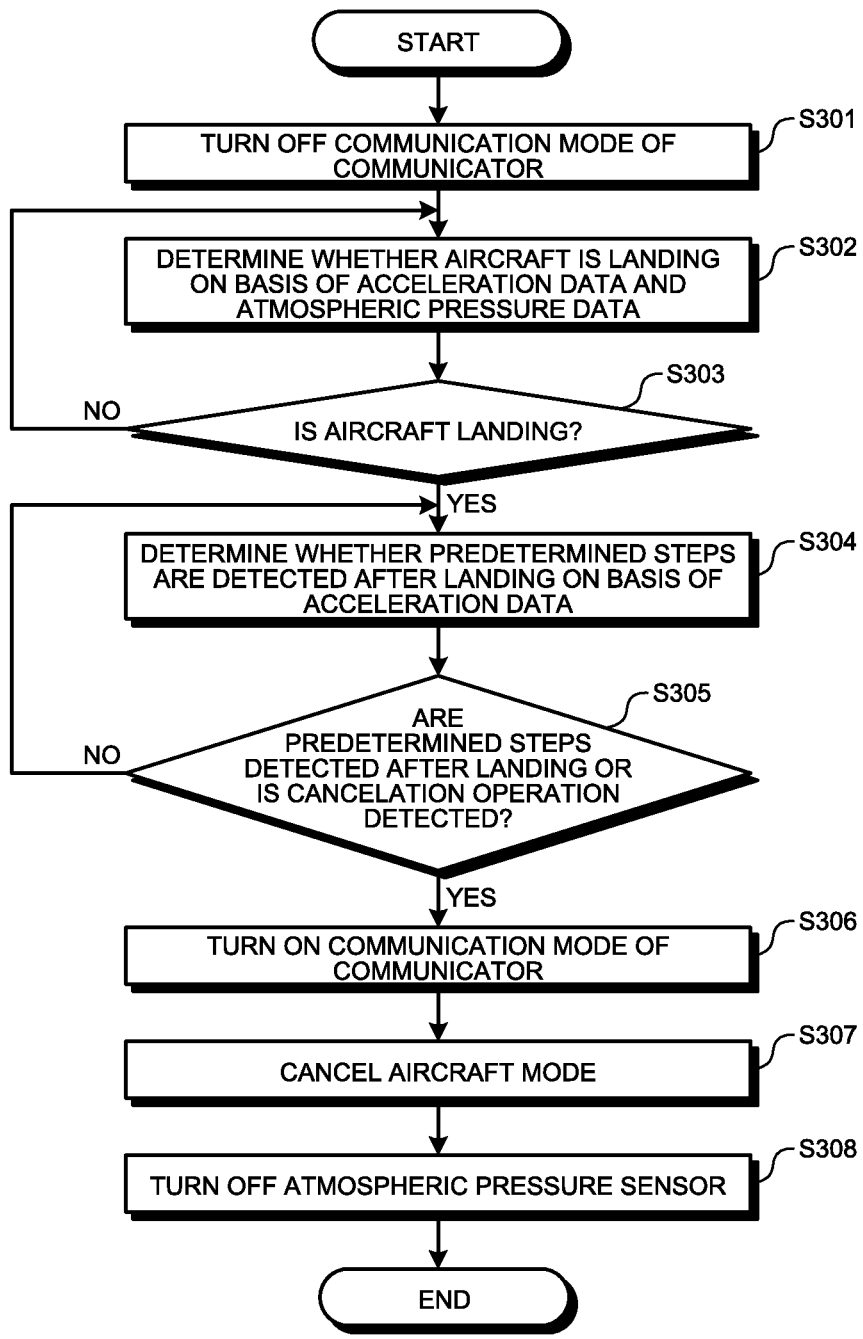
FIG. 8 is a flowchart that illustrates an example of a process that corresponds to an aircraft mode by the mobile phone.

With reference to FIG. 8, an explanation is given of an example of a process that corresponds to the aircraft mode by the mobile phone 1. FIG. 8 is a flowchart that illustrates an example of the process that corresponds to the aircraft mode by the mobile phone 1. The process, illustrated in FIG. 8, is performed by the controller 10 if the mobile phone 1 is in the aircraft mode.

When the operation, corresponding to the aircraft mode, is performed, the controller 10 turns off the communication mode of the communicator 6 at Step S301, as illustrated in FIG. 8. At Step S302, the controller 10 determines whether the aircraft is landing based on the acceleration data 9b and the atmospheric pressure data 9c. Specifically, if a change in the acceleration and an increase in the atmospheric pressure during landing, indicated by the determination condition in the determination data 9d, are detected, the controller 10 determines that the aircraft is landing. If the aircraft is not landing, i.e., if the aircraft is in flight (No at Step S303), the controller 10 returns to Step S302. If the aircraft is landing (Yes at Step S303), the controller 10 proceeds to Step S304.

At Step S304, the controller 10 determines whether predetermined steps are detected after the aircraft has landed based on the acceleration data 9b. The predetermined steps mean, for example, continuous steps for more than a predetermined time period. Examples of the predetermined time period include, but are not limited to, a time required for the user to descend the boarding ladder and reach the customs or the lobby. If predetermined steps are not detected after the landing, and if the operation to cancel the aircraft mode by the user is not detected (No at Step S305), the controller 10 returns to Step S304. If predetermined steps are detected after the landing, or if the operation to cancel the aircraft mode by the user is detected (Yes at Step S305), the controller 10 proceeds to Step S306.

At Step S306, the controller 10 turns on the communication mode of the communicator 6. At Step S307, the controller 10 cancels the aircraft mode. At Step S308, the controller 10 turns off the atmospheric pressure sensor 16. The order of the operations from Step S306 to Step S308 may be arbitrarily changed. Then, the controller 10 terminates the process that is illustrated in FIG. 8.

With regard to the above-described the process that is illustrated in FIG. 8, an explanation is given of a case where the controller 10 cancels the aircraft mode when predetermined steps of the user are detected after the determination of landing of the aircraft; however, the method of cancelling the aircraft mode is not limited thereto. For example, the mobile phone 1 may cancel the aircraft mode when landing of the aircraft is determined.

Embodiments, disclosed in the present application, may be modified without departing from the summary and the scope of the application. Furthermore, embodiments and modifications, disclosed in the present application, may be combined as appropriate. For example, embodiments may be modified as below.

For example, the program, illustrated in FIG. 1, may be divided into multiple modules or may be combined with a different program.

According to embodiments, a modification may be made such that the mobile phone 1 detects takeoff and landing of the aircraft by using only the atmospheric pressure acting on the mobile phone. With reference to FIG. 9, an explanation is given of a modification of determination for aircraft by the mobile phone 1. FIG. 9 is a flowchart that illustrates a process in the modification of determination for aircraft by the mobile phone 1. The process, illustrated in FIG. 9, is performed when the controller 10 executes the control program 9a. The process, illustrated in FIG. 9, is performed by the controller 10 when the mobile phone 1 determines the moving state by aircraft.

As illustrated in FIG. 9, the controller 10 of the mobile phone 1 turns on the atmospheric pressure sensor 16 at Step S401. At Step S402, the controller 10 determines whether the aircraft is taking off based on the atmospheric pressure data 9c. If the aircraft is not taking off (No at Step S403), the controller 10 returns to Step S402. If the aircraft is taking off (Yes at Step S403), the controller 10 proceeds to Step S404.

At Step S404, the controller 10 sets the moving state by aircraft. At Step S405, the controller 10 sets the aircraft mode. At Step S406, the controller 10 turns off the communication mode of the communicator 6.

At Step S407, the controller 10 determines whether the aircraft is landing based on the atmospheric pressure data 9c. Specifically, if the controller 10 detects an increase in the atmospheric pressure during landing, indicated by the determination condition in the determination data 9d, it determines landing of the aircraft. If the aircraft is not landing (No at Step S408), the controller 10 returns to Step S407. If the aircraft is landing (Yes at Step S408), the controller 10 proceeds to Step S409.

At Step S409, the controller 10 turns on the communication mode of the communicator 6. At Step S410, the controller 10 cancels the aircraft mode. At Step S411, the controller 10 turns off the atmospheric pressure sensor 16. The order of the operations from Step S409 to Step S411 may be arbitrarily changed. Afterward, the controller 10 terminates the process that is illustrated in FIG. 9.

The mobile phone 1 is capable of determining whether the moving vehicle is an aircraft based on only a change in the atmospheric pressure. The mobile phone 1 may determine the moving state by aircraft without determining the moving state by a different vehicle while moving on the runway of the aircraft. The mobile phone 1 may perform a control that corresponds to the moving state by aircraft without performing a control that corresponds to the moving state by a different vehicle.

In the above-described process that is illustrate FIG. 9, an explanation is given of a case where, when the controller 10 determines that the aircraft is landing, it cancels the aircraft mode. The method of canceling the aircraft mode by the mobile phone 1 is not limited thereto. For example, after the mobile phone 1 determines that the aircraft is landing, it may cancel the aircraft mode when a predetermined time elapses. For example, as is the case with the process that is illustrated in FIG. 8, after the mobile phone 1 determines that the aircraft is landing, it may cancel the aircraft mode when it detects predetermined steps by the user. For example, the mobile phone 1 may cancel the aircraft mode when it detects a stop of the aircraft after landing.

In embodiments, an explanation is given of a case where the mobile phone 1 separately determines the moving state by walking or running and the moving state by aircraft. The mobile phone 1 is not limited thereto. For example, the mobile phone 1 may determine the moving state by walking or running and the moving state by aircraft in combination.

For example, in the case of the moving state by aircraft, the mobile phone 1 may determine walking or running in the aircraft. In this case, the mobile phone 1 previously stores, as the determination data 9d, a threshold of steps for determining a move in the aircraft. When the continuous steps more than the threshold of steps are detected, the mobile phone 1 determines that it is not the moving state by vehicle.

In embodiments, an explanation is given of a case where the mobile phone 1 determines the moving state by aircraft after takeoff. The method of determining the moving state by aircraft by the mobile phone 1 is not limited thereto. For example, the mobile phone 1 may determine that the mobile phone 1 is located in the airport by using the GPS function. When the mobile phone 1 determines that it is located in the airport, it may conduct voice recognition on announcements before boarding or in-flight announcements before takeoff by using the microphone 8. The mobile phone 1 may determine the moving state by aircraft if it recognizes the announcements before boarding or the announcements inside the aircraft. The mobile phone 1 may determine the moving state by aircraft before takeoff and perform a control that corresponds to the moving state by aircraft. If it fails to perform the voice recognition on announcements, the mobile phone 1 may determine the moving state by aircraft after takeoff.

In embodiments, an explanation is given of a case where, if the mobile phone 1 determines the moving state by aircraft, it sets the aircraft mode. The mobile phone 1 is not limited thereto. For example, when the mobile phone 1 determines the moving state by aircraft, it makes a notification to the user and waits for a user's operation. The mobile phone 1 may set the aircraft mode when it detects the user's operation of affirmation. The notification to users includes "boarding aircraft now?", or the like.

In embodiments, an explanation is given of the mobile phone as an example of mobile electronic devices; however, the mobile electronic device according to the attached claim is not limited to mobile phones. The mobile electronic device according to the attached claim may be a mobile electronic device other than the mobile phone. Example of the mobile electronic devices include, but are not limited to, a smartphone, mobile phone, tablet, portable personal computer, digital camera, smart watch, media player, electronic book reader, navigator, game machine, etc.

Characteristic embodiments have been described to disclose the technology according to the attached claim fully and clearly. However, the attached claim may not be limited to embodiments, and it needs to be configured such that all the modifications and alternative configurations, which may be invented by a person skilled in the art, are implemented within the scope of the fundamental matters that are described in this specification.

The invention claimed is:

1. A mobile electronic device, comprising:
a sensor; and
at least one controller configured to perform a control based on a detection result that is detected by the sensor, wherein
the at least one controller is configured to determine a moving state by aircraft based on the detection result that is detected by the sensor,
the mobile electronic device comprises an acceleration sensor configured to detect an acceleration acting on the mobile electronic device,
when the at least one controller detects the moving state by aircraft, the at least one controller is configured to stop detecting a moving state by walking based on the acceleration detected by the acceleration sensor until landing is detected,
the sensor includes an atmospheric pressure sensor configured to detect atmospheric pressure, and
the at least one controller is configured to
turn ON the atmospheric pressure sensor when the at least one controller detects a moving state by vehicle based on the acceleration detected by the acceleration sensor, and
determine the moving state by aircraft based on a detection result that is detected by the atmospheric pressure sensor.

2. The mobile electronic device according to claim 1, wherein
the at least one controller is configured to determine the moving state by aircraft by a decrease in the atmospheric pressure, and
after a determination of the moving state by aircraft, the at least one controller is further configured to keep the determination of the moving state by aircraft until the atmospheric pressure increases.

3. The mobile electronic device according to claim 1, wherein, after a determination of the moving state by aircraft, the at least one controller is further configured to set an aircraft mode.

4. The mobile electronic device according to claim 1, wherein, after a determination of the moving state by aircraft, the at least one controller is further configured to disconnect a connection to a predetermined network.

5. A control method for a mobile electronic device that includes a sensor and an acceleration sensor configured to detect an acceleration acting on the mobile electronic device, the method comprising:
performing a control based on a detection result that is detected by the sensor;
determining a moving state by aircraft based on the detection result that is detected by the sensor; and
when the moving state by aircraft is detected, stopping detecting a moving state by walking based on the acceleration detected by the acceleration sensor until landing is detected, wherein
the sensor includes an atmospheric pressure sensor configured to detect atmospheric pressure, and
the method further comprises:

turning ON the atmospheric pressure sensor when a moving state by vehicle is detected based on the acceleration detected by the acceleration sensor; and determining the moving state by aircraft based on a detection result that is detected by the atmospheric pressure sensor.

6. A non-transitory storage medium that stores a control program for causing a mobile electronic device, including a sensor and an acceleration sensor configured to detect an acceleration acting on the mobile electronic device, to execute a process comprising:

performing a control based on a detection result that is detected by the sensor;

determining a moving state by aircraft based on the detection result that is detected by the sensor; and when the moving state by aircraft is detected, stopping detecting a moving state by walking based on the acceleration detected by the acceleration sensor until landing is detected, wherein the sensor includes an atmospheric pressure sensor configured to detect atmospheric pressure, and the process further comprises:

turning ON the atmospheric pressure sensor when a moving state by vehicle is detected based on the acceleration detected by the acceleration sensor; and determining the moving state by aircraft based on a detection result that is detected by the atmospheric pressure sensor.

* * * * *